(12) United States Patent
Fausak

(10) Patent No.: US 7,587,711 B2
(45) Date of Patent: Sep. 8, 2009

(54) SYSTEM AND METHOD FOR GENERALIZED IMAGING OR COMPUTING TASKS UTILIZING A LANGUAGE AGENT AND ONE OR MORE SPECIFICATIONS

(75) Inventor: Andrew T. Fausak, San Jose, CA (US)

(73) Assignee: WYSE Technology Inc., San Jose, CA (US)

( * ) Notice: Subject to any disclaimer, the term of this patent is extended or adjusted under 35 U.S.C. 154(b) by 1007 days.

(21) Appl. No.: 10/787,224

(22) Filed: Feb. 27, 2004

(65) Prior Publication Data

US 2005/0193393 A1     Sep. 1, 2005

(51) Int. Cl.
G06F 9/45        (2006.01)
(52) U.S. Cl. .................. 717/139; 717/106; 717/108; 717/114; 717/116; 717/136; 712/2
(58) Field of Classification Search ......... 717/106–109, 717/114–117, 136, 139–143; 713/1, 2, 100
See application file for complete search history.

(56) References Cited

U.S. PATENT DOCUMENTS

| | | | | |
|---|---|---|---|---|
| 6,466,972 | B1 * | 10/2002 | Paul et al. | 709/222 |
| 6,816,963 | B1 * | 11/2004 | Krithivas et al. | 713/1 |
| 7,107,441 | B2 * | 9/2006 | Zimmer et al. | 713/1 |
| 7,159,106 | B2 * | 1/2007 | Meaney et al. | 713/2 |
| 7,228,405 | B2 * | 6/2007 | Rothman et al. | 713/1 |
| 7,231,513 | B1 * | 6/2007 | Eydelberg | 713/2 |
| 7,395,324 | B1 * | 7/2008 | Murphy et al. | 709/223 |
| 2007/0266120 | A1 * | 11/2007 | Tallieu et al. | 709/220 |

OTHER PUBLICATIONS

"White Paper On Thin Client Benefits", Newburn Consulting, Version 1a, Mar. 27, 2002.

"Total Cost Of Application Ownership (TCA)", by Atul Kapoor, The Tolly Group, No. 199503, Jun. 1999.

"TCO Analyst: A White Paper on GartnerGroup's Next Generation Total Cost Of Ownership Methodology" by GartnerConsulting, Stamford, CT, 1997.

(Continued)

*Primary Examiner*—Lewis A Bullock, Jr.
*Assistant Examiner*—Jue S Wang
(74) *Attorney, Agent, or Firm*—McDermott Will & Emery LLP

(57) ABSTRACT

The present invention discloses a method and system for specifying and executing computing tasks in a preboot execution environment in general, and, in particular, a method and system for generalized imaging utilizing a language agent and encapsulated object oriented polyphase preboot execution and specification language. The target customization is advantageously accomplished by encapsulating target dependent parameters in specification files. The target specific parameters are resolved at appropriate execution time when the parameter information becomes available. Such approach simplifies specification of complex tasks to a merely few lines of code. The approach of the present invention nevertheless affords reliable, robust, and accurate performance, because the pertinent parametric information are resolved only when they can be accurately ascertained. Furthermore, the specification encapsulations are themselves a part of the image set, providing self-describing images with self-contained imaging methods. The result is a robust, reliable, flexible, and simple method and system for centralized maintenance and management of client devices in a networked enterprise computing environment with a lower total cost of ownership than existing products.

96 Claims, 9 Drawing Sheets

OTHER PUBLICATIONS

"BIOS Boot Specification" Compaq Computer Corporation, Phoenix Technologies Ltd., and Intel Corporation, Version 1.01, Jan. 11, 1996.

"Preboot Execution Environment (PXE) Specification" Intel Corporation, Version 2.1, Sep. 20, 1999.

* cited by examiner

```
@echo off
REM ****************************************************************
REM Get functional script for reading from generic "gen" devices.
REM
REM (c) 2003 Wyse Technology
REM
REM Script "geti2d.bat" Begin
REM
REM Output: "get.i2d" Partition Type 2
REM
set gVERSION = "get.i2d Version 8.5"
REM
REM ****************************************************************
REM ****** Remove OLD archive
del get.i2d
REM
REM ****************************************************************
REM Display GET version
set gVERSION > ver.msg
file2img ver.msg                                          stream/con/ver.msg
del ver.msg
REM ****** Check for OVERLOAD
file2img -if              archive/get.i2d
file2img       "-<SRCCLIproto><SRCdevice>getOVL.i2d"       archive/get.i2d
file2img       "-archive/<SRCTMPproto><SRCTMPdevice>get.i2d"  archive/get.i2d    "<SRCTMPproto><SRCTMPdevice>get.i2d"
file2img -else            archive/get.i2d
REM ****************************************************************
REM Now we create an archive that creates an image for a drive
REM ****************************************************************
file2img -encode          archive/get.i2d          "-archive/<ENCproto><ENCdevice><ENCimage>"
REM At extraction time, all syntax will be placed into the runtime class  "<ENCproto><ENCdevice><ENCimage>"
REM ****************************************************************

REM ****************************************************************
REM Script "put.i2d" Generator Begin
REM ****************************************************************

REM ****** Remove OLD stuff

REM ****** Create messages
echo    NAND DRIVE 00                         > formatmsg.msg
echo    No REGISTRY found during RAPPORT restoration (atf) > fake.msg
```

FIG. 8a

```
REM ******************************************************
REM ****** Validate Security Key
file2img "-~<SRCsec>"                          archive/get.i2d          "<DSTsec>"
REM ******************************************************
REM ****** Specify type of test/perform test
file2img "-~<SRCtest>"                         archive/get.i2d          "<DSTtest>"
REM ******************************************************
REM ****** Check for hostname.arc and copy if there
file2img -if                  archive/get.i2d
file2img    "-~<DSTLCLproto><DSTdevice>hostname.arc" archive/get.i2d   "<DSTTMPproto><DSTTMPdevice>hostname.arc"
file2img    -if               archive/get.i2d
file2img      "-~<DSTLCLproto><DSTdevice>wfacss.reg" archive/get.i2d   "<DSTTMPproto><DSTTMPdevice>wfacss.reg"
file2img    -else
file2img      fake.msg        archive/get.i2d
file2img    -endif            archive/get.i2d
file2img    -if               archive/get.i2d
file2img      "-~<DSTLCLproto><DSTdevice>wfacss0.reg" archive/get.i2d  "<DSTTMPproto><DSTTMPdevice>wfacss0.reg"
file2img    -else
file2img      fake.msg        archive/get.i2d
file2img    -endif            archive/get.i2d
file2img -endif               archive/get.i2d REM ******************************************************
REM ****** Netxfer Model for Archive Creation
REM ****** Copy NOR FLASH
file2img "-~<GET09>"                           archive/get.i2d          "<PUT09>"
REM ****** Copy CMOS FLASH
file2img "-~<GET06>"                           archive/get.i2d          "<PUT06>"
REM ****** Signal Event Format
file2img "-~<GET01>"                           archive/get.i2d          "<PUT01>"
REM ****** Copy Allocation/MBR Data
file2img "-~<GET07>"                           archive/get.i2d          "<PUT07>"
REM ****** Partition FIX
file2img "-~<GET03>"          archive/get.i2d
REM ****** Copy Partition IMAGE
file2img "-~<GET08>"          archive/get.i2d                           "<PUT08>"
REM ****** Partition FIX
file2img "-~<GET03>"          archive/get.i2d                           "<PUT03>"
REM ****** Copy VERSIONS
file2img "-~<GET04>"          archive/get.i2d                           "<PUT04>"
REM ****** Copy VERSIONS
file2img "-~<GET05>"                           archive/get.i2d          "<PUT05>"

REM ******************************************************
REM ****** RESTORE hostname.arc if there
file2img -if                  archive/get.i2d
file2img    "-~<DSTTMPproto><DSTTMPdevice>hostname.arc" archive/get.i2d "<DSTLCLproto><DSTdevice>hostname.arc"
file2img    -if               archive/get.i2d
file2img      "-~<DSTTMPproto><DSTTMPdevice>wfacss.reg" archive/get.i2d "<DSTLCLproto><DSTdevice>wfacss.reg"
file2img    -endif            archive/get.i2d
file2img    -if               archive/get.i2d
file2img      "-~<DSTTMPproto><DSTTMPdevice>wfacss0.reg" archive/get.i2d "<DSTLCLproto><DSTdevice>wfacss0.reg"
file2img    -endif            archive/get.i2d
file2img -endif
```

FIG. 8b

```
REM ***********************************************************
REM ****** Mark End of Transfer (give control back to calling script)

file2img ~EOT          archive/get.i2d         ~EOT

REM ***********************************************************

REM ****** Cleanup
del formatmsg.msg
del fake.msg
set gVERSION=

REM ***********************************************************
REM Script "putgeni2d.bat" End
REM ***********************************************************

REM ***********************************************************
file2img ~encodeoff         archive/get.i2d
REM ***********************************************************

REM ****** Undo Class-overload test
file2img ~endif             archive/get.i2d

REM ****** Mark End of Transfer (give control back to calling script)
file2img ~EOT          archive/get.i2d         ~EOT

REM ***********************************************************

REM ***********************************************************
REM Script "getgeni2d.bat" Generator End
REM ***********************************************************
```

SYSTEM AND METHOD FOR GENERALIZED IMAGING OR COMPUTING TASKS UTILIZING A LANGUAGE AGENT AND ONE OR MORE SPECIFICATIONS

BACKGROUND OF THE INVENTION

1. Field of the Invention

The present invention relates generally to specifying and executing computing tasks in a preboot execution environment, and specifically to generalized imaging or computing tasks utilizing a language agent and one or more specifications.

2. Description of the Related Art

Network-based computing has been gaining popularity in recent years as a more desirable approach to managing enterprise computing needs. Ranging from network-managed PCs, network computers, and thin-clients, network-based computing is largely motivated by the need to reduce the cost of providing IT services (known as the Total Cost of Ownership, TCO) in networked computing environments. It is well known in the industry that the most expensive part of providing computing resources to end-users is not the cost of the computing hardware and software but the cost of on-going maintenance and management. See, Thin Client Benefits, Newburn Consulting (2002); Total Cost of Application Ownership, The Tolly Group Whitepaper (1999); TCO Analyst: A White Paper on GartnerGroup's Next Generation Total Cost of Ownership Methodology, GartnerConsulting (1997). According to the well known studies, network-based computing approach dramatically reduces the TCO by centralizing the maintenance and management functions of IT services, thereby reducing the recurring cost of on-going maintenance and management.

A key component of network-based computing is Remote Imaging, that is, installing images on client computers from centrally managed image servers. Remote Imaging is also synonymous to or closely related to Remote Image Installation and Remote Device Management. The basic idea is that centralized maintenance and management of client computers is accomplished by installing or delivering operating system or application images from a centrally managed servers. Existing technologies such as Microsoft Remote Installation Service, Symantec Ghost, and Rapport Device Management, all provide a method of remote imaging.

For remote imaging of operating system components, remote imaging operation is usually initiated during a preboot phase. In other words, it is desirable to transfer operating system images to the client computer before it boots so that the client computer boots with the newly installed operating system images or components. Clearly, this preboot phase is the most critical aspect of remote imaging, as the client computer will not function properly at all if wrong operating system image or components were delivered.

In a network with significant number of client computers or devices, the preboot phase of remote imaging presents special challenges due to numerous types of devices or computers that need to be managed. For example, the types of machines and corresponding images or components must be ascertained during the preboot phase where none of the typical operating system utilities or application tools are available. Ideally, what is needed is a tool that runs at the client computers during preboot because the client machine is the best place to ascertain what hardware it has and what operating system and software it needs. Furthermore, a maximum flexibility would be afforded by a generalized specification language for specifying and executing computing tasks during the preboot phase. Although preboot imaging and operating system installation is a complex process, much of the process can be parameterized at some abstract level. For example, installation of device drivers, often the most challenging part of installation, can be parameterized as: if X device is found, install Y device driver file. Moreover, overall scheme of operation of remote imaging may be quite similar for many types of devices, e.g., downloading bootstrap code, OS kernel, device drivers, system DLLs, etc. Thus, such operation can be parameterized if the unknown parameters are resolved at the client side by the client devices during execution of remote imaging operations. However, no vendor currently provides a generalized specification language for the preboot execution environment.

Without a generalized specification language for the preboot execution environment, the specification and management of images and components at the central image server is a highly complex process with many inherent risks. The device type of the clients must be ascertained beforehand, and images and components must be prepared for each device types within which all devices must have identical hardware. Then, the client device type must be verified when the images and components are delivered to the client devices. The complexities and difficulties of this process is mainly attributable to information mismatch—that is, trying to manage at the server side operations which critically depends on information at the client side. Thus, a generalized specification language for the preboot execution environment which runs at the client machines will also greatly simplify the management functions at the central server. Instead of complex scripts and programs to prepare images and components, all that is needed is a simple specification that provides: if x, y, z hardware or configuration is found, perform X, Y, Z tasks.

It can be seen, then, there is a need in the field for a system and a method for specifying and executing imaging tasks in a preboot execution environment.

SUMMARY OF THE INVENTION

Accordingly, the present invention addresses the foregoing need by providing a system and method for specifying and executing computing tasks in a preboot execution environment in general, and by providing, in particular, a method and system for generalized imaging utilizing a language agent and encapsulated object oriented preboot execution and specification language.

According to one aspect of the invention, the present invention is a system for executing computing tasks in a preboot execution environment, comprising a language agent with a preboot execution language interpreter. The language agent interprets specifications for performing computing tasks in the preboot execution environment, and performs the specified computing tasks. The preboot execution language interpreter can be an object-oriented language interpreter, and the specification can be an encapsulation, encapsulating parameters resolved by the preboot execution language interpreter at execution time. The computing tasks can be those for accomplishing general image installation, platform imaging, remote imaging, remote booting, preboot computer diagnostics, and preboot device management.

According to another aspect of the invention, the present invention is a system for specifying computing tasks in a preboot execution environment, comprising a language agent with a preboot execution specification generator. The preboot execution specification generator can be an object-oriented language code generator, and the generated specifications can be encapsulations, encapsulating parameters resolved at execution time. The computing tasks specified can be those for accomplishing general image installation, platform imaging, remote imaging, remote booting, preboot computer diagnostics, and preboot device management.

According to yet another aspect of the invention, the present invention is a system for encapsulated platform imaging, comprising a language agent with an encapsulated language interpreter for executing an encapsulation, wherein the encapsulation contains all instructions and data necessary to install an operating system onto a computing device. Imaging of an entire platform is accomplished through a single, self-describing encapsulation instance by executing or interpreting the self-describing encapsulation by the language agent with an encapsulated language interpreter.

Encapsulated platform imaging of the present invention provides several advantages over existing methods. With existing technologies, such as Ghost or Rapport, the applications or software programs utilized to accomplish imaging is separate from the program code, as well as from the data or component images necessary for imaging. The intelligence of the application is relied upon to place the component images onto a client to obtain the state desired on the client machine. Thus, entirely different set of program code is required for each different type of platforms; and the applications, the program codes, and the component images must be maintained separately. A set of component images must be preserved along with the corresponding programs that image a particular client device type. In contrast, according to the present invention, only a single encapsulation is required to obtain the same desired state on the client device. Since all target dependent information are parameterized and encapsulated, the same class-object definition can be used to accomplish platform imaging for any platform. Encapsulated platform imaging is a self-contained as well as self-describing method to accomplish platform imaging.

It can be seen, then, the present invention provides a more robust, reliable, and accurate execution or performance of specified computing tasks, as the target specific parameters are resolved only when the parameterized information becomes available at the appropriate phase to discover the pertinent information. The result is a robust, reliable, flexible, and simple method and system for centralized maintenance and management of client devices in a networked enterprise computing environment with a lower total cost of ownership than existing products.

Other and further objects and advantages of the present invention will be further understood and appreciated by those skilled in the art by reference to the following specification, claims, and drawings.

BRIEF DESCRIPTION OF THE DRAWINGS

Referring now to the drawings in which like reference numbers represent corresponding parts throughout:

FIG. 8a to FIG. 8c show example code for generating a polyphase encapsulation according to the present invention; and FIG. 9 illustrates a polyphase encapsulation generated by the example code shown in FIG. 8a to FIG. 8c according to the present invention.

DETAILED DESCRIPTION OF THE INVENTION

Figure 1:
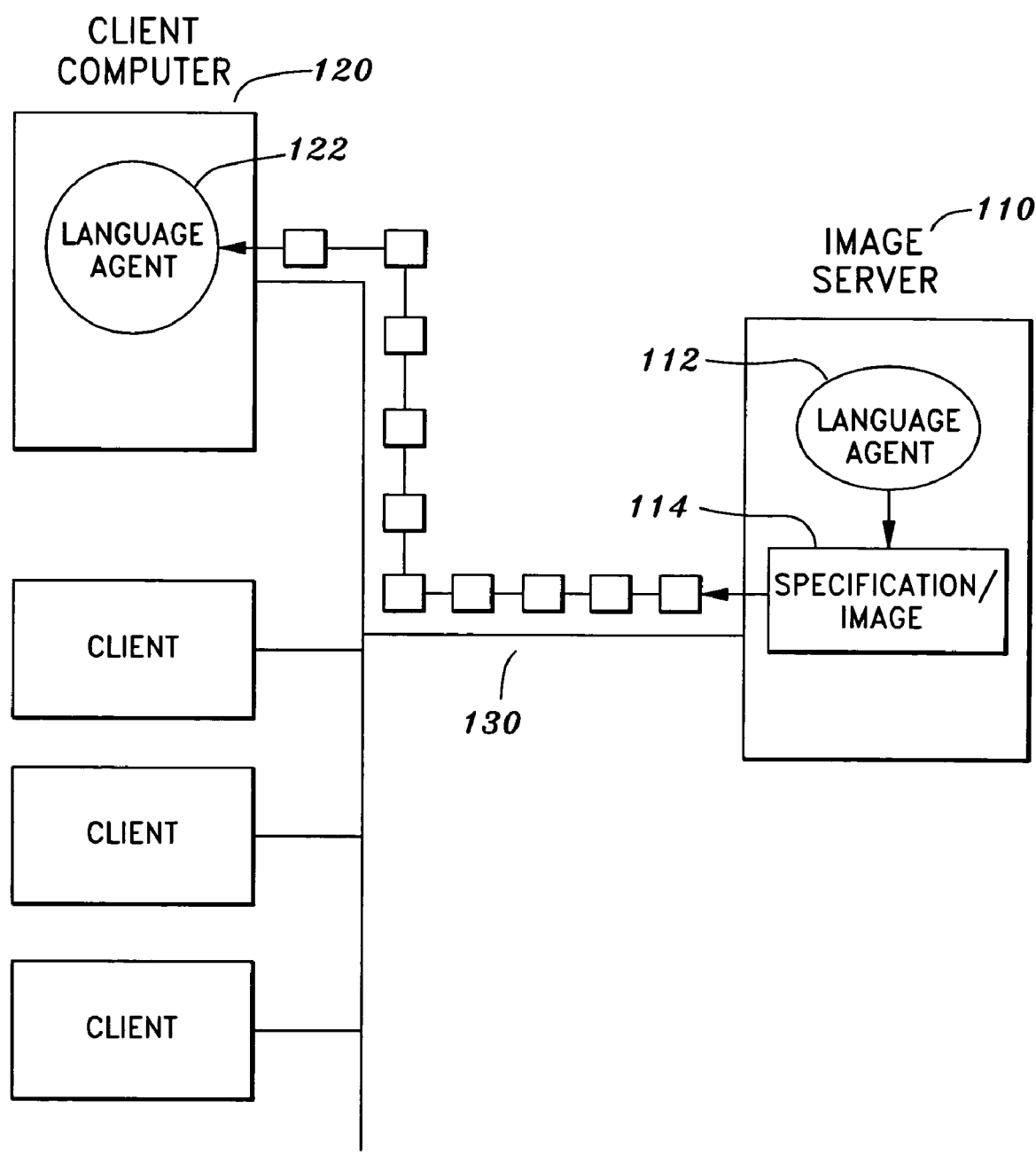
FIG. 1 illustrates an overview of a system according to the present invention.

FIG. 1 illustrates an overview of a system according to the present invention. As shown in FIG. 1, the system environment in which the present invention operates comprises Image Server (110), Server Language Agent (112), Specification and Image (114) generated by Server Language Agent (112), Client Computer (120), Client Language Agent (122), and Network (130). As also shown in FIG. 1, Specification and Image (114) generated by Server Language Agent (112) is delivered to Client Computer (120) over Network (130), and processed by Client Language Agent (122) to perform computing tasks specified in Specification and Image (114).

In one aspect of the invention, the present invention is a system for executing computing tasks in a preboot execution environment, comprising a language agent with a preboot execution language interpreter. As well known to those skilled in the art, a preboot execution environment is a computing environment at a computer before the computer completes booting—i.e., completes loading an operating system (OS).

Figure 2:
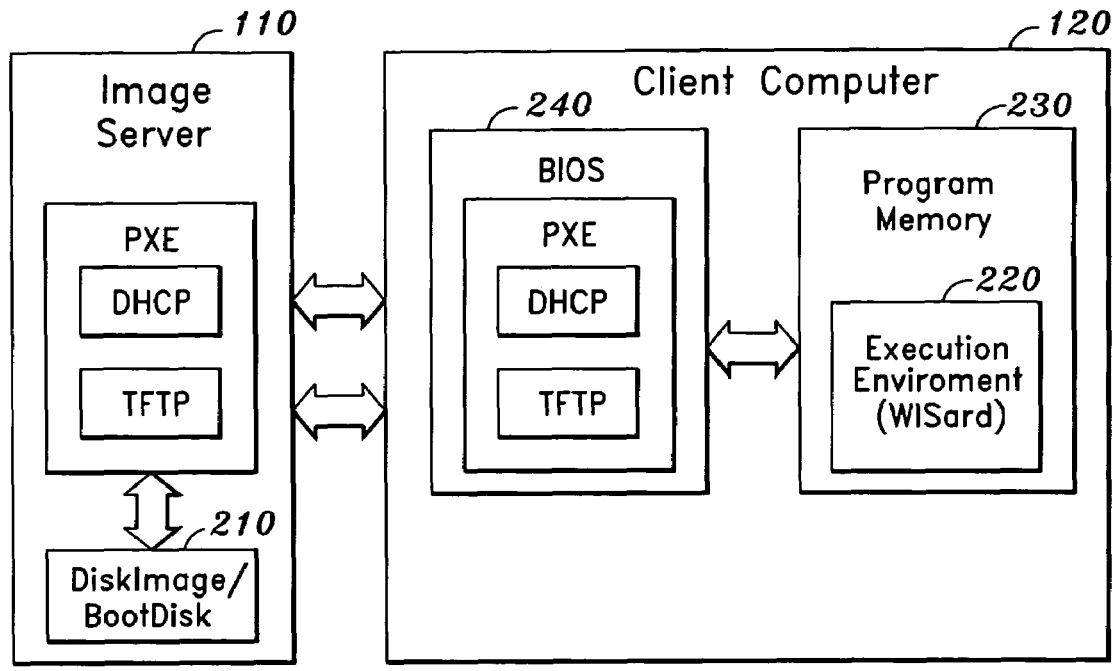
FIG. 2 illustrates a preboot execution environment according to the present invention.

FIG. 2 illustrates a preboot execution environment according to the present invention. As shown in FIG. 2, a preferred embodiment of the present invention operates in the Preboot Execution Environment (PXE). PXE is a widely-adopted industry standard for network booting or remote booting over a network that provides a way for network cards to initiate a network connection to servers before any OS is loaded so that the OS images or components can be downloaded over the network. See, "Preboot Execution Environment (PXE) Specification Version 2.1", by Intel Corporation, September 1999. As illustrated in FIG. 2, ImageDisk/BootDisk (210) is downloaded from Image Server (110) to Client Computer (120) over Network (130) utilizing PXE facilities. ImageDisk/BootDisk (210) contains computer code that initializes operation of Client Computer (120) and provides Execution Environment (220) in Program Memory (230) of Client Computer (120). A preferred embodiment of Execution Environment (220) is Wyse Imaging System (WISard) execution environment. However, Execution Environment (220) can be any preboot execution environment known to those skilled in the art without departing from the scope of the present invention.

To briefly describe the operation of network boot and PXE, the booting process of a client computer starts at the ROM BIOS (240) of Client Computer (120) which contains code for recognizing the network interface card (NIC) as an IPL Device (Initial Program Load Device) from which to boot and load an operating system. See, "BIOS Boot Specification", by Compaq Computer Corporation, Phoenix Technologies Ltd., and Intel Corporation, January 1996. The network card in turn must also be a bootable device such as a PXE-enabled NIC. PXE includes DHCP (Dynamic Host Configuration Protocol) that allows IP address assignment to the NIC at Client Computer (120) so that Client Computer (120) may communicate with Image Server (110) over Network (130) utilizing industry standard TCP/IP network protocol. In addition, PXE supports TFTP (Trivial File Transfer Protocol) of TCP/IP suite for transferring files over Network (130). The network card can also employ any preboot communication protocol known to those skilled in the art such as the IBM RPL (Remote Program Load) without departing from the scope of the present invention.

When Client Computer (120) initiates booting, the BIOS Boot code instructs the PXE-enabled NIC to perform PXE operation—DHCP, DHCP-proxy and TFTP transfer—to obtain the initial OS boot code, which in turn connects to a boot server, for example, Image Server (110), to download the initial OS boot code, which can be provided by an image, DiskImage (210), or a proprietary archive, BootDisk (210). When loaded to Program Memory (230) of Client Computer (120), DiskImage/BootDisk (210) code provides Execution Environment (220) such as WISard. For legacy OS support, Execution Environment (220) then traps the pre-OS disk access requests (INT 13 in PC architecture) and redirects them to the PXE-enabled NIC so that the necessary OS files can continue to be downloaded to Client Computer (120). For non-legacy OS support, INT13-interception is not required since bootstrap may contain all intelligence to perform preboot functions. That is, no INT13 related translation is required since the bootstrap contains operating intelligence (such as WISard). In either case, the entire boot process is completely transparent to users on Client Computer (120).

Figure 3:
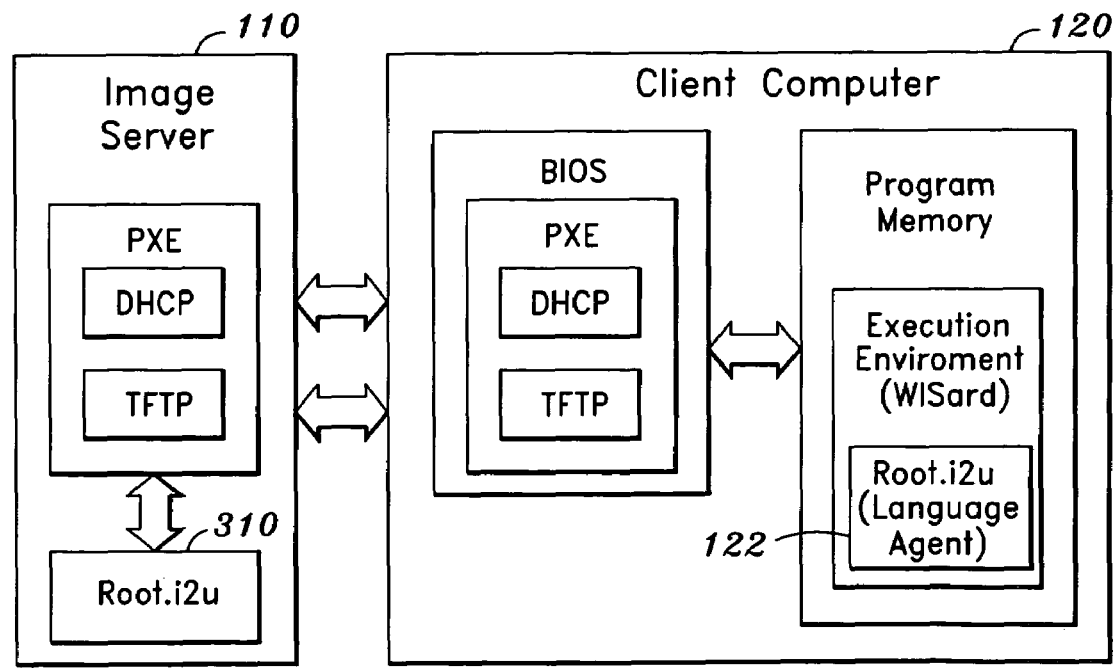
FIG. 3 illustrates downloading and operation of a language agent at a client computer according to the present invention.

FIG. 3 illustrates downloading and operation of a language agent at a client computer according to the present invention. As shown in FIG. 3, the first image file downloaded to Client Computer (120), designated as Root.i2u (310), contains code for Client Language Agent (122). All subsequent image files downloaded are processed by Client Language Agent (122).

A key component of Client Language Agent (122) is a preboot execution language interpreter, which is a general purpose interpreter which can interpret and execute specifications for preboot computing tasks in accordance with the supported syntax and semantics. The preboot execution language interpreter of Client Language Agent (122) of the present invention, thus allows processing of any computing task at Client Computer (120) by transmitting to Client Computer (120) files which contain specifications for preboot computing tasks. Since a computer language is by nature symbolic, abstract entity, this process is better understood when viewed from a symbolic, or more accurately, a logical perspective.

Figure 4:
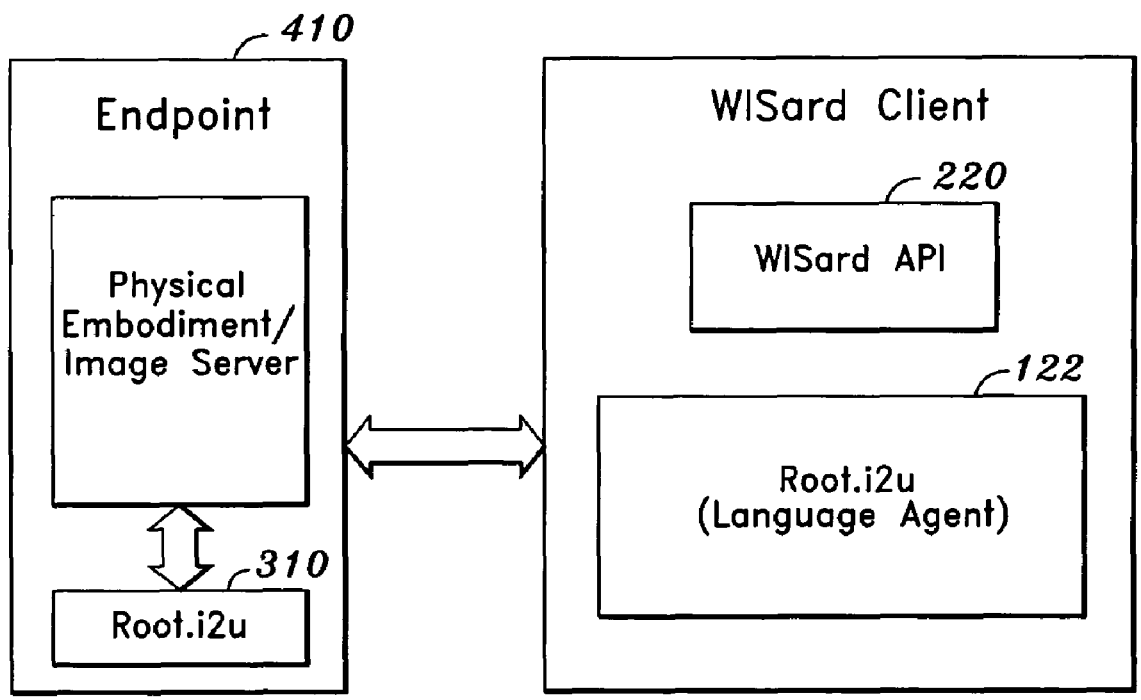
FIG. 4 illustrates a logical view of downloading a language agent according to the present invention.

FIG. 4 illustrates a logical view of downloading a language agent according to the present invention. Any file or image is an Endpoint (410), which in the present case is Root.i2u (310). A more complete definition and description of an Endpoint is given below. As shown in FIG. 4, Root.i2u (310) provides code that operates as Client Language Agent (122) in WISard Execution Environment (220).

Figure 5:
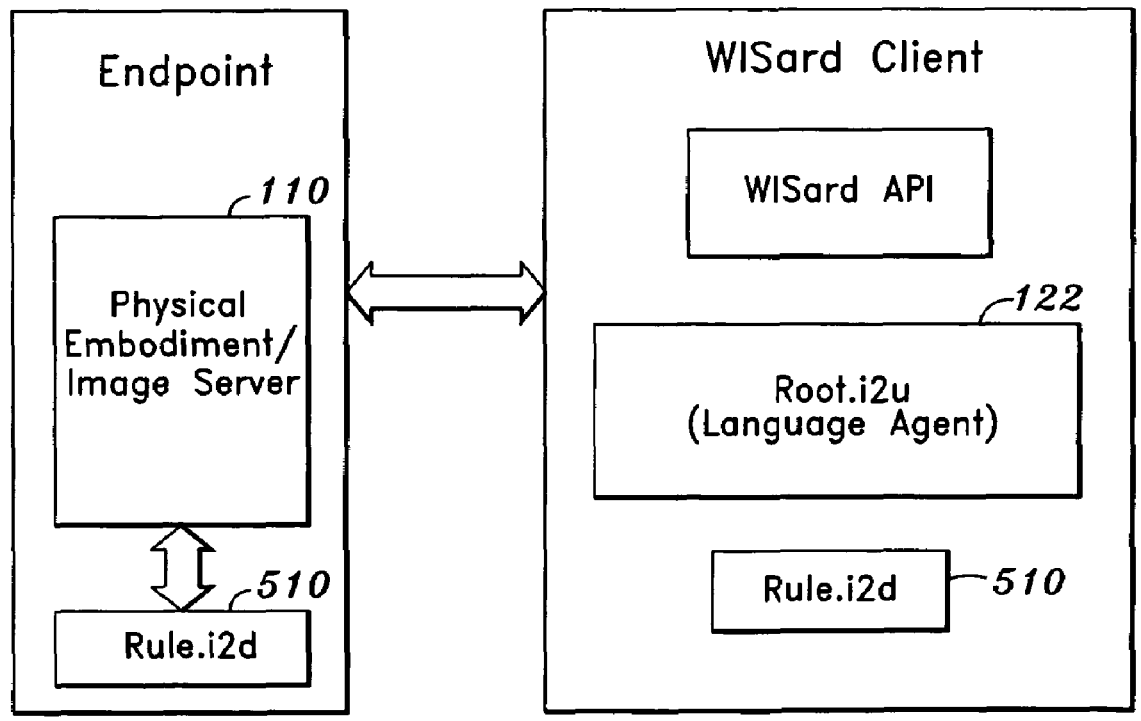
FIG. 5 illustrates downloading a specification file according to the present invention.

FIG. 5 illustrates downloading a specification file according to the present invention. As shown in FIG. 5, a specification file, designated as Rule.i2d (510) is downloaded from Image Server (110), and processed by Client Language Agent (122). The preboot execution language interpreter of Client Language Agent (122) interprets the specifications for executing computing tasks contained in Rule.i2d (510) and performs the specified computing tasks. Rule.i2d (510) can also contain instructions to download further specification files.

Figure 6:
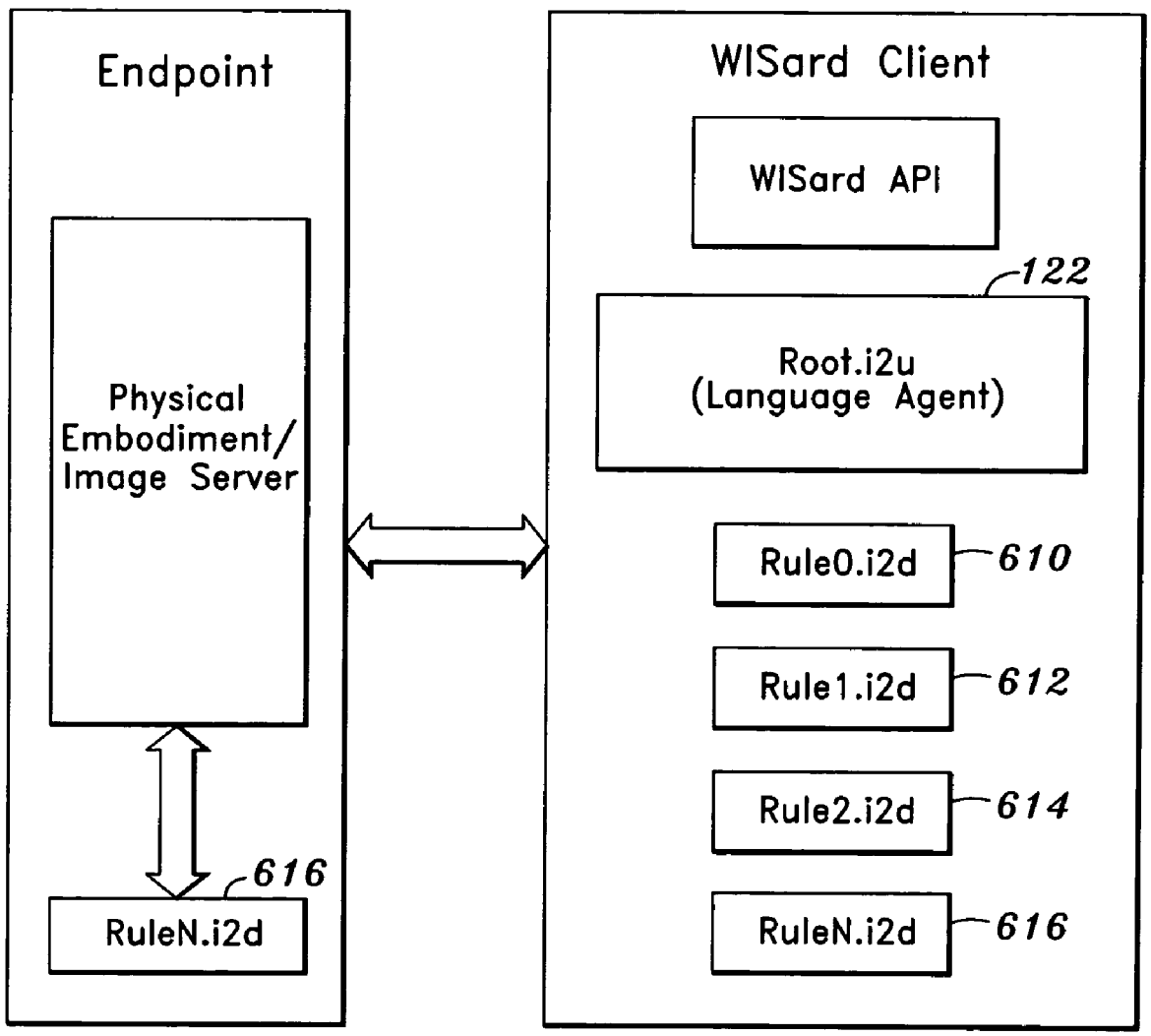
FIG. 6 illustrates downloading a series of specification files according to the present invention.

FIG. 6 illustrates downloading a series of specification files according to the present invention. As shown in FIG. 6, a series of specification files, designated as Rule0.i2d (610), Rule1.i2d (612), Rule2.i2d (614), and RuleN.i2d (616), are downloaded in succession by chain download instructions contained in the files. Since this process can be continued for an arbitrary number of times, any computing task can be specified and performed in the preboot execution environment. The computing tasks can be those for general imaging, platform imaging, remote imaging, remote booting, preboot computer diagnostics, and computer preparations ("prepping") such as formatting and partitioning the hard disks on Client Computer (120), without departing from the scope of the present invention.

The veracity of these propositions, remarkable they may be, would become evident when the syntax of the preboot execution and specification language of the present invention is described. First, definitions of the terms are given. (1) "Method" is the means to provide data through an endpoint. Some examples of methods are stream/, fswyse/, fsfat/, or any other WISard supported method. (2) "Location" provides for a complete description of a physical interface; this is where data is actually located. Examples of location are: ide0-0/, ide0-1/, ide1-0, and ide1-1/ for IDE hard disk drives; nand/ and nor/ for flash memory devices; or any WISard supported location or device. (3) "Reference" is used as an operator to define a sub-part of a method/location/definition. An example of a reference name is a file on a device through a file-system, e.g., fsfat/ide1-0/file, or any WISard supported reference. (4) "Endpoint" is a Location of a data image, Method of retrieval, and Reference name. Endpoints are generally of the form: Method/Location/Reference. (5) "Pipe" is a pair of well-defined endpoints comprising source and destination information from which to read and write data.

Given the foregoing definitions, the syntax of the preboot execution specification language of the present invention is as follows. First, the preboot execution specification language of the present invention provides an instance copy language where a left-side (LHS) is copied to the right hand-side (RHS). It operates in a manner similar to a familiar MS-DOS 'copy' operation: "LangPXE f1 f2", where the instance f1 is copied and a new instance f2 is created by the language agent LangPXE. Note that f1 and f2 may also contain any additional drive or path information formally utilized by the file-system rules. Second, the language of the present invention provides a means of device copying describing a physical path to the instance: "LangpXE physical-path/f1 physical-path/f1". An example of this type of copying is copying entire content of one hard disk drive and place it onto another hard disk. For instance, when "LangPXE ide0-0/f1 ide0-1/f2" is carried out, a duplicate of ide0-0 drive is created on ide0-1 drive.

Third, the language of the present invention provides a means of copying or applying an endpoint to the instance: "LangPXE Method 1/Location 1/Reference 1 Method2/Location2/Reference2." For example, "LangPXE stream/ide1-0/disk.raw tftp/disk.raw" would copy disk ide1-0 to file disk.raw over a network using TFTP. Fourth, the language of the present invention provides a means of describing a Transport for the purpose of executing its described copy operations. In other words, the Transport contains instructions for executing copy operations. A Transport is also called an Archive in the present invention. Also, it is said that the copy operations are "encapsulated" in the Transport or Archive. For example, "LangPXE stream/ide1-0/disk.raw archive/rule.i2d tftp/disk.raw" would encapsulate the copy operation "stream/ide1-0/disk.raw tftp/disk.raw" in the archive/rule.i2d file. In general, the form of the syntax for this purpose is: "LangPXE LHS ARCHIVE RHS". Fifth, the language of the present invention provides a means of describing the extraction (or unpacking) of an archive for the purpose of performing an encapsulated copy operation. For example, "LangPXE archive/rule.i2d" will result in execution of operations encapsulated in archive/rule.i2d.

Sixth, the language of the present invention provides a means of defining symbols for LHS, RHS, and ARCHIVE type. For example, "LangPXE f1 definesymbols/" will define symbols specifically defined in the instance represented by f1. Seventh, the language of the present invention provides symbolic or parametric LHS, RHS, and ARCHIVE types. The parametric types are denoted by < > notation. For example, "LangPXE <f1> archive/<T1> <f2>" encapsulates operations "LangePXE <f1> <f2>" into Transport archive/<T1>, where <f1> and <f2> can substitute for any allowable LHS and RHS forms, respectively, and <T1> can be any Transport reference. In other words, <f1>, <T1>, and <f2> are "variables" or "parameters". <T1> and <f2> can be NULL, i.e., nonexistent.

Eighth, the language of the present invention provides de-referencing of LHS. De-reference operation is denoted by ~ operator. For example, with "LangPXE ~f1 archive/T1 f2", archive/T1 created will not contain the instance represented by f1 until archive/T1 is actually executed. Instead, archive/T1 will contain "~f1 f2", which specifies "f1 f2" operation when archive/T1 is executed. In contrast, with "LangPXE ~f1 archive/T1 f2", archive/T1 created contains "f1 f2" operation, which is executed when archive/T1 is executed. Thus, ~ operator effects de-referencing. Another way to understand de-referencing is "nesting" of operations at successive phases of operations specified. "f1 f2" runs the specified operation at the level (or phase) of archive/T1 execution. In contrast, "~f1 f2" runs "f1 f2" operation at the level of execution of one of the tasks specified by execution of archive/T1, that is, one level down or nested from archive/T1. That is, the object represented by f1 is not contained in the archive/T1, but only the reference is specified. When archive/T1 is executed, f1's object is satisfied and the object is copied to f2. Ninth, the language of the present invention provides de-referencing to the Nth degree, that is de-referencing nested to the Nth level. For example, "LangPXE ~~f1 archive/T1 f2" will create the instance of f1 only after the second level event specified in the Transport archive/T1 takes place.

Tenth, the language of the present invention provides a means of initiating and terminating encapsulation (or encoding) of archives (or transports). "LangPXE ~encode archive/T1 T2" will result in all subsequently defined LHS to be placed or referenced in T1 to be placed into T2, and "LangPXE ~encodeoff archive/T1 T2" will terminate the encoding or encapsulation process for T2.

Eleventh, the language of the present invention provides a means of referencing other archives from a single archive. "LangPXE archive/t2 archive/t1" will result in archive/t2 called from archive/t1. Twelfth, the language of the present invention provides a means of returning when called from another archive. "LangPXE RETURN archive/t1" will result in returning to the calling archive which called archive/t1.

Thirteenth, the language of the present invention provides a means of describing conditional operations. "LangPXE ~if archive/t2" will result in the evaluation of the next completed pipe description and process all pipes immediately following the evaluation if the process returned success. If however, it returned false, the process would skip all arguments contained in the transport until coming upon the syntax, "LangPXE ~endif archive/t2."

Finally, the language of the present invention provides a means of encapsulating within an encapsulation, denoted by @ operator. For example, "LangPXE @archive/t2 archive/t1" will encapsulate archive/t2 within archive/t1, so that when archive/t1 is executed one of the tasks performed is execution of archive/t2 archive.

Although the language of the present invention is primarily directed to a preboot execution environment, it should also be noted that the language is a general language that can be operated in any execution environment known to those skilled in the art without departing from the scope of the present invention.

Now, with the syntax described above, it is possible to specify and execute any preboot computing tasks, including general imaging, platform imaging, remote imaging, remote booting, preboot diagnostics, and preboot prepping. For example, a "pull" operation in imaging, where images are copied by a client from a server, can be simply specified as: "stream/ide1-0/disk.raw ftp/disk.raw", which will result in making an duplicate copy of ide1-0 disk over a network by using FTP. Furthermore, "Platform.k stream/sec/validate; stream/ide1-0/disk.raw ftp/disk.raw" will perform: (1) validating Platform is of correct type; and (2) in making a duplicate copy of ide1-0 disk over a network by using FTP. Similarly, a simple "push" operation, where images are copied by a server to a client, can be specified as: "ftp/disk.raw stream/ide1-0/disk.raw". Remote booting can be accomplished in an analogous fashion, since remote booting is simply providing images necessary over a network to boot a client computer.

Client or Target specific customization can be accomplished by utilizing the parametric capability of the language of the present invention. For example, "<GET00> <T00> <PUT00>", when "<GET00>=ValidLHS," and "<T00>=NULL," will provide an immediate pull-and-push operation, where the object represented by LHS is written as an object to RHS. This is a pull-and-push operation (Immediate Write). Using the same example, "<GET00>=ValidLHS, and <T00>=archive/validTransport," will provide any generalized object-pipe operation where object represented by ValidLHS syntax is immediately placed into an encoding named <T00>. This operation is a pull operation (Immediate Read) which, when <T00> is later executed by the language interpreter, will result in a completed copy operation that places the data-object now contained in the transport <T00> to the now valid RHS reference <PUT00>. This secondary operation is a push operation (Transported Write). In contrast to this example, "<GET00> <T00> <PUT00>", where "<GET00>=~ValidLHS" and "<T00>=archive/ValidTransport," will provide any generalized reference-pipe operation, where ValidLHS reference-syntax is placed into an encoding named <T00>, which, when <T00> is later executed by the language interpreter, will result in read from LHS (ValidLHS) and a write to RHS reference <PUT00>. This is a delayed-pull-and-push operation (Delayed Immediate Write).

This differs from the first generalized statement when the current executed transport itself has syntax to encode yet another transport by use of the "~encode" operation. In this example, "<GET00> <T00> <PUT00>" where "<T00>=archive/ValidTransport" and "<GET00>=+ValidLHS," causes the object read during the encoding process to be placed into the newly created encoding (future transport). This is an Encoded-Immediate-Read operation and will result in a literal object being placed into a transport as did the previously described pull operation encoding above. Note that in all cases shown, the operators delayed when the existence of LHS occurred and where the placement of the eventual object was to be placed (RHS or Transport).

The parametric specification and execution capability of the language of the present invention affords one aspect of object-oriented character of the language. For instance, "<method1>/<location1>/disk1.raw <method2>/<location2>/disk2.raw" is a general specification for a pull-andpush operation. Furthermore, the archive that contains this line is an encapsulation of generalized pull-and-push operation. While an encoding specifying "<method 1>/<location 1>/disk 1.raw archive/<T00> <method2>/<location2>/disk2.raw" is a generalized pull operation, placing all drive contents into the transported archive indicated by the symbol <T00>; later executing the archive <T00> will result in a push operation.

As illustrated above, the language of the present invention has capability for symbolic translation, that is, denoting parameters with symbols and resolving that an appropriate time. Moreover, the symbol definitions can be placed in a separate file, a symbol file, to translate or resolve the symbols. Another implication of symbolic translation is the ability to modify the encapsulations by replacing symbols with resolved definitions or with yet another symbol or symbols, since a symbol, by definition, can be anything.

In another aspect of the invention, the present invention is a system for specifying computing tasks in a preboot execution environment, comprising a language agent with a preboot execution specification generator. As described in the syntax specification above, the language of the present invention is an interpreter of preboot computing task specification as well as a generator of preboot computing task specification. For example, the archives or transports generated by the present language are encapsulated specifications. Therefore, the language of the present invention is also employed by Server Language Agent (112) to generate preboot computing task specifications. The specified computing tasks can be any tasks supportable by the present invention, including, but not limited to, general imaging, platform imaging, remote imaging, remote booting, preboot diagnostics, and preboot prepping.

Thus, complex scripts generated by the existing technologies can be reduced to merely a few lines with parametric specifications. Furthermore, by utilizing parameters and symbols, target or client dependent parameters can be specified in encapsulations before even knowing what the target or client machines will be. With symbolic translation and capability to include encapsulations within another encapsulation, the present invention provides a powerful, flexible, generalized method of specifying computing tasks in preboot environment. Therefore, encapsulations can be used provide a generalized specification for any class of computing operations, including, but not limited to, general imaging, platform imaging, remote imaging, remote booting, preboot diagnostics, and preboot prepping. Such operations or tasks can be encapsulated in an encapsulation of the present invention even when the ultimate target destination or client environment is not known at the time of definition or specification.

From the foregoing, it is evident that the language of the present invention has at least two behaviors in three distinct phases—that is, the language behaves as a specification generator at the server during task definition phase, and as a specification interpreter and generator during the specification generation and execution phase. In the example discussed above, "<method>/<location>/disk.raw archive/<T00><method2>/disk.raw", the distinct phases are: a definition phase, where the encoding is defined; a generation phase, where the archive <T00> is generated by pull operation; and an execution phase, where push operation is performed when the archive <T00> is executed. However, there is no reason to limit specification function at the server or during the definition phase. Since the operations described by the present language can be de-referenced or nested to Nth degree by the ~ operator, execution of an archive can also generate specification by appropriate instructions. In addition, the @ operator allows encapsulating entire archives within an archive. Thus, the language of the present invention exhibits behavior that changes depending on the execution environment. In object-oriented design literature, this type of behavior is called Polymorphic behavior. Therefore, the language of the present invention has polymorphic behavior with respect to the different "Phases" of operation. That is, the present language is a "Polyphase" language.

According to another aspect of the invention, the present invention is an encapsulated object-oriented polyphase language for specifying computing tasks in multiple phases of generating and executing preboot execution specification, comprising: a computing task specification generator; and a computing task interpreter, wherein behaviors of generated specification are polymorphic with respect to the multiple phases of generating and executing preboot execution specification. The multiple phases of generating and executing preboot execution specification comprise: a definition phase, wherein computing tasks are defined; a generating phase, wherein specifications for the computing tasks are generated; and an execution phase, wherein the specifications for the computing tasks are executed.

Figure 7:
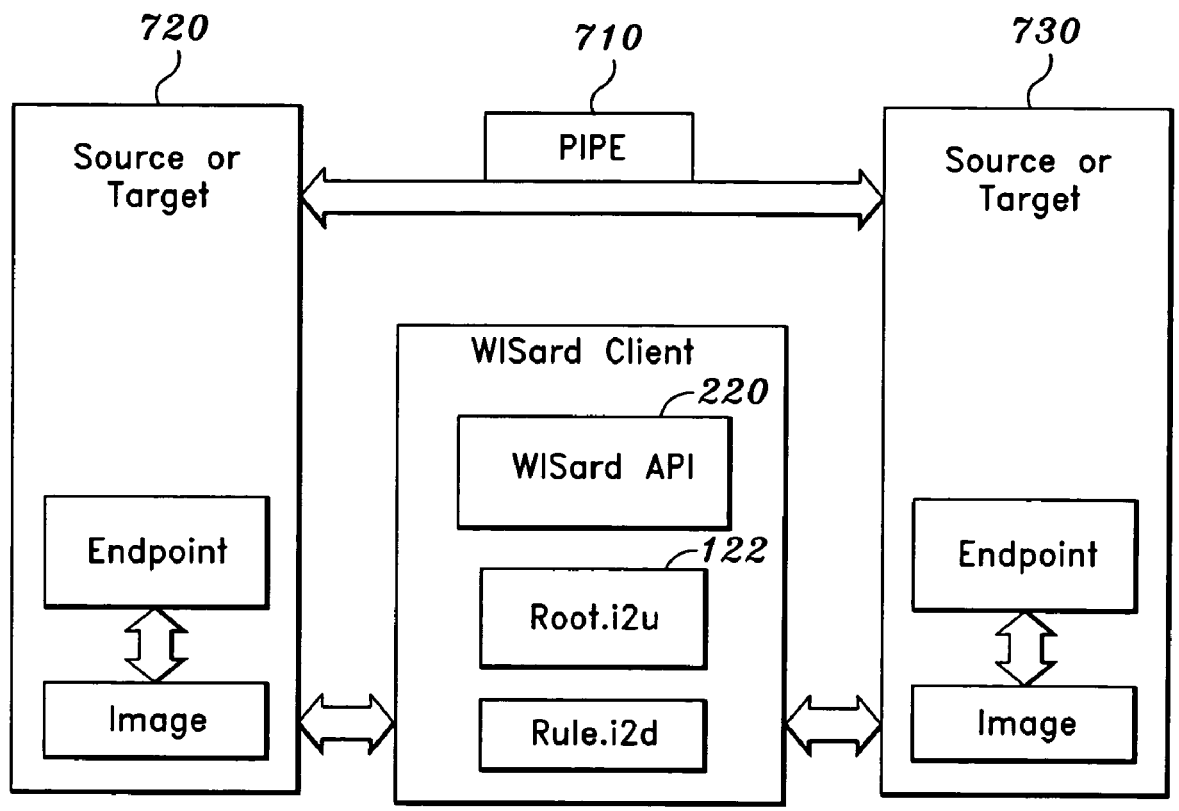
FIG. 7 illustrates a conceptual overview of logical operation of an encapsulated object-oriented polyphase language according to the present invention.

FIG. 7 illustrates a conceptual overview of logical operation of an encapsulated object-oriented polyphase language according to the present invention. As shown in FIG. 7, a computing task in a preboot execution environment can be specified as a set of Pipes (710), comprising a pair of Endpoints (720 and 730), where Endpoint (720) as well as Endpoint (730) can be any source or target. A set of Pipes (710) is then executed by Client Language Agent (122) under WISard Execution Environment (220).

Because the language of the present invention is a polyphase language, exactly the same language is used for both Client Language Agent (122) and Server Language Agent (112). This means that both Client Language Agent (122) and Server Language Agent (112) can generate encapsulations and interpret (or execute) the encapsulation. Thus, an encapsulation of the present invention can be modified, propagated, multiplied, or otherwise manipulated in any way. For example, an encapsulation can translate symbols and modify itself or create another encapsulation by Server Language Agent (112) or Client Language Agent (122). Client Language Agent (122), while executing an encapsulation, can generate yet another encapsulation that is to be executed at a later time, e.g., when some desired parameters can be ascertained appropriately, such as additional hardware.

Figure 9:
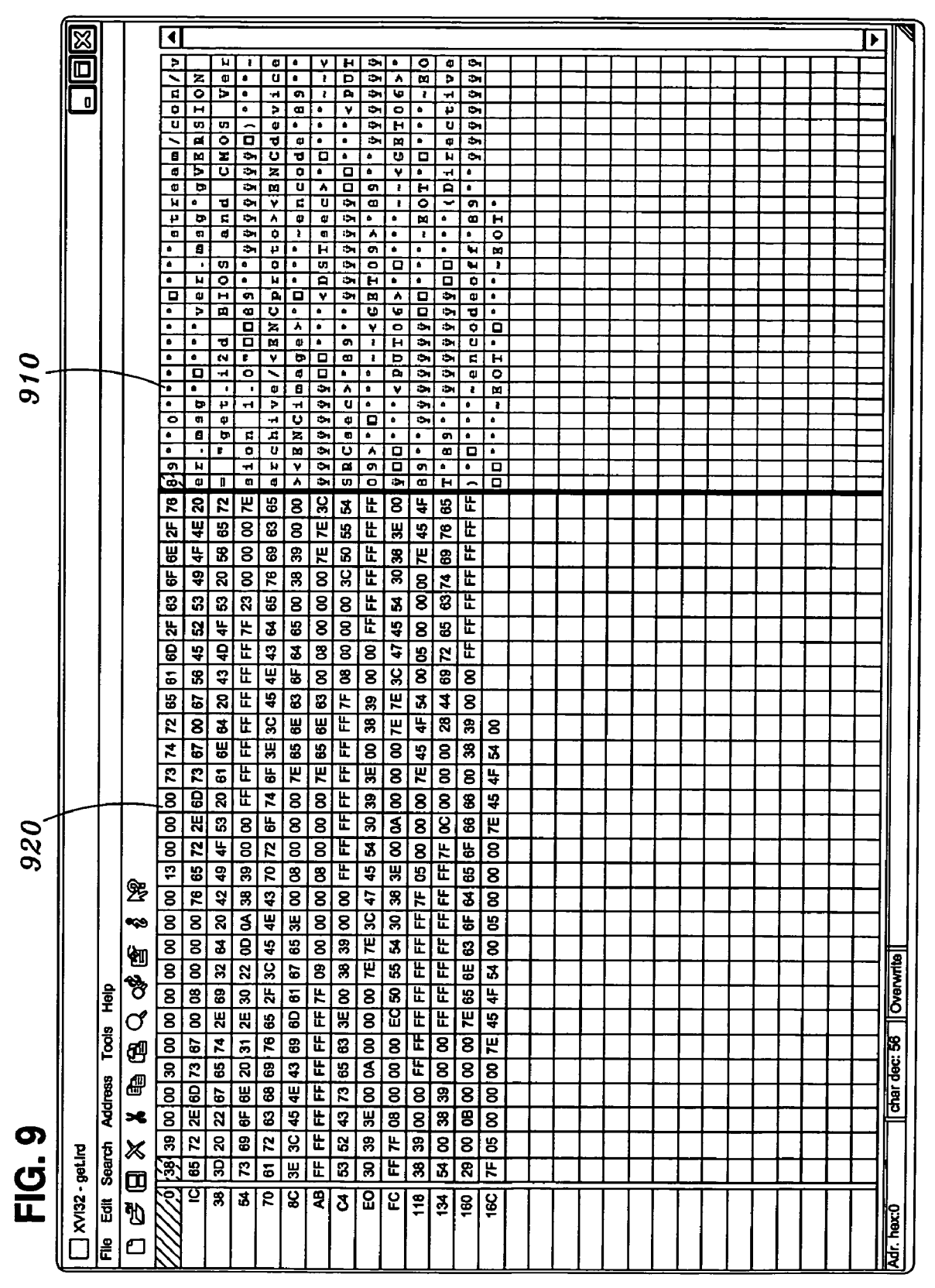

FIG. 8*a* to FIG. 8*c* show example code for generating a polyphase encapsulation according to the present invention; and FIG. 9 illustrates a polyphase encapsulation generated by the example code shown in FIG. 8*a* to FIG. 8*c* according to the present invention. FIG. 9 shows a view of the generated encapsulation, which is a binary image file, by using a binary file viewer. The right pane (910) shows an ASCII representation, and the left pane (920) shows a hexadecimal (Hex) representation.

The fact that the specification files, or rule encapsulations are binary files—that is, binary images—underscores an important point. It is that the archives, i.e., the rule or specification files, are simply a part of the image set for the overall imaging process. They are downloaded by PXE as if the files are just any OS component files. Thus, the images are self-describing images. In other words, the images contain all instructions necessary to execute or accomplish their purpose, such as installing the images, booting from the images, or executing any function or set of functions specified. Furthermore, the images encapsulate all parametric behaviors resolved during the appropriate levels of execution nesting.

Thus, all target customization is encoded in the image files themselves. The image files are encapsulated method-images.

Encapsulated imaging is particularly suited for Platform Imaging, which is defined as installing operating system images on a computing device. Examples of Platform Imaging are: installing Windows XP on a PC, installing Windows CE on an embedded computing device, and installing PocketPC on a hand-held device. In general, Platform Imaging is a target computing device dependent operation because what operating system can be installed on a target depends on the type and capabilities of the target hardware. Thus, Platform Imaging can be advantageously accomplished by encapsulated imaging, since all target dependent parameters can be encapsulated in the images themselves.

According to one aspect of the invention, the present invention is a system for encapsulated platform imaging, comprising a language agent with an encapsulated language interpreter for executing an encapsulation, wherein the encapsulation contains all instructions and data necessary to install an operating system onto a computing device. Imaging of an entire platform is accomplished through a single, self-describing encapsulation instance by executing or interpreting the self-describing encapsulation by the language agent with an encapsulated language interpreter. For this purpose, the encapsulation can be considered as persistent encapsulation of operating system class. The operating system can be any operating system known to those skilled in the art, including, but not limited to, Windows XP, Windows 2000, Windows NT, Windows Me, Windows 98, Windows CE, PocketPC, various flavors of Unix systems, and Linux, without departing from the scope of the present invention. The computing device can be any computing device known to those skilled in the art, including, but not limited to, a desktop PC, a notebook PC, an embedded computing device, and a hand-held device. It is important to note that, for platform imaging, the operation is not necessarily limited to preboot environments. For example, an update operation of an existing operating system installation need not take place during preboot time. It can be performed while an operating system is up and running.

Encapsulated platform imaging of the present invention provides several advantages over existing methods. According to the present invention, only a single encapsulation is required to obtain a desired state on the client device. Since all target dependent information are parameterized and encapsulated, the same class-object definition can be used to accomplish platform imaging for any platform. Moreover, as described above, the language agent for executing an encapsulation itself can be a part of the method-image encapsulation. Hence, encapsulated platform image is self-contained as well as self-describing, and, therefore, an encapsulation is complete by itself to accomplish platform imaging. No programs or codes need to be preserved separate from the images.

Furthermore, all supporting or ancillary operations or computing tasks necessary to accomplish platform imaging can also be encapsulated in the encapsulated method-image itself. For example, hardware configuration and capabilities of a target device can be ascertained and compared for validation process. A status or result of one operation or process can be reported to another. Ancillary tasks such as hostname preservation, OS image preservation, and maintaining and configuring BIOS version and CMOS settings can be encapsulated in the same single encapsulation instance, representing the update operation of all of these parameters.

According to the present invention, an encapsulation and the language agent with an encapsulated language interpreter can be provided over a logical connection. A logical connection can be any method of providing data known to those skilled in the art, including, but not limited to, a computer readable medium and a network connection without departing from the scope of the present invention. A computer readable medium can be any computer readable medium known to those skilled in the art, including, but not limited to, a diskette, a compact disc, and a flash disk device without departing from the scope of the present invention. Thus, platform imaging can be accomplished through a single encapsulation instance stored on or delivered from a diskette, a compact disc, a flash disk device, or a network connection.

In addition, a bootable interface, which is an initial boot facility, can be provided on or over a logical connection. For instance, a diskette or compact disc containing an encapsulation can be a bootable disk or a bootable compact disc. Similarly, a network connection can provide an initial boot facility by a bootable NIC such as a PXE-enable NIC. With a bootable interface provided, a target device can boot from the logical connection, load the language agent with an encapsulated language interpreter, load the rest of the encapsulation, and interpret or execute the encapsulation with the language agent to accomplish the entire platform imaging operation. Thus, the computer readable medium or a network connection endpoint represent a complete, self-contained, self-describing method of platform imaging. Encapsulated platform imaging with encapsulated method-image is simple to define, create, maintain, inventory, and distribute, reducing the complex process of platform imaging to a simple, elegant, and straightforward procedure.

It can seen, then, from the foregoing that the language of the present invention provides a more robust, reliable, and accurate execution or performance of specified tasks, as the target specific parameters are resolved only when the parameterized information becomes available at the appropriate phase to discover the pertinent information. The result is a robust, reliable, flexible, and simple method and system for centralized maintenance and management of client devices in a networked enterprise computing environment with a lower total cost of ownership than existing products.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A system for executing computing tasks in a preboot execution environment, comprising:
a computer readable medium comprising:
a language agent with a preboot execution language interpreter, the language agent from a second system; and
at least one specification for performing at least one computing task in the preboot execution environment, the at least one specification from the second system,
wherein the language agent is configured to interpret the at least one specification for performing at least one computing task in the preboot execution environment, and configured to perform the at least one computing task specified,
wherein the at least one specification from the second system is an encapsulation, encapsulating parameters to be resolved at the system at execution time by the preboot execution language interpreter from the second system, wherein the language agent is configured to generate one or more encapsulations and to interpret one or more encapsulations, wherein the language agent is based on an encapsulated object-oriented polyphase language, and wherein while executing an encapsulation, the language agent is configured to generate another encapsulation.

2. The system of claim 1, wherein the preboot execution language interpreter is an object-oriented language interpreter.

3. The system of claim 1, wherein the encapsulated parameters are parametric behaviors as well as parametric data.

4. The system of claim 1, wherein the at least one computing task includes copying or applying an endpoint to an instance.

5. The system of claim 1, wherein the at least one computing task includes a de-referencing operation.

6. The system of claim 1, wherein the at least one computing task includes initiating or terminating encapsulation of archives.

7. The system of claim 1, wherein the at least one computing task includes referencing archives from a single archive.

8. The system of claim 1, wherein the language agent is configured to generate encapsulations and to interpret the encapsulations.

9. The system of claim 1, wherein while executing an encapsulation, the language agent is configured to generate another encapsulation that is to be executed at a later time.

10. A system for image installation in a preboot execution environment, comprising:
a computer readable medium comprising:
a language agent with a preboot execution language interpreter, the language agent from a second system; and
at least one specification for performing at least one task for image installation in the preboot execution environment, the at least one specification from the second system,
wherein the language agent is configured to interpret the at least one specification, and configured to perform the at least one task specified,
wherein the at least one specification is an encapsulation, encapsulating parameters to be resolved at the system at execution time by the preboot execution language interpreter from the second system,
wherein the language agent is configured to generate one or more encapsulations and to interpret one or more encapsulations,
wherein the language agent is based on an encapsulated object-oriented polyphase language, and
wherein while executing an encapsulation, the language agent is configured to generate another encapsulation.

11. The system of claim 10, wherein the preboot execution language interpreter is an object-oriented language interpreter.

12. The system of claim 10, wherein the encapsulated parameters are parametric behaviors as well as parametric data.

13. The system of claim 10, wherein an image set for image installation itself is a self-describing encapsulation, containing the at least one specification as an encapsulation which encapsulates parameters resolved by the preboot execution language interpreter at execution time.

14. A system for remote imaging in a preboot execution environment, comprising:
a computer readable medium comprising:
a language agent with a preboot execution language interpreter, the language agent from a second system; and
at least one specification for performing at least one task for remote imaging over a network in the preboot execution environment, the at least one specification from the second system,
wherein the language agent is configured to interpret the at least one specification, and configured to perform the at least one task specified,
wherein the at least one specification is an encapsulation, encapsulating parameters to be resolved at the system at execution time by the preboot execution language interpreter from the second system,
wherein the language agent is configured to generate one or more encapsulations and to interpret one or more encapsulations,
wherein the language agent is based on an encapsulated object-oriented polyphase language, and
wherein while executing an encapsulation, the language agent is configured to generate another encapsulation.

15. The system of claim 14, wherein the preboot execution language interpreter is an object-oriented language interpreter.

16. The system of claim 14, wherein the encapsulated parameters are parametric behaviors as well as parametric data.

17. The system of claim 14, wherein an image set for remote imaging itself is a self-describing encapsulation, containing the at least one specification as an encapsulation which encapsulates parameters resolved by the preboot execution language interpreter at execution time.

18. A system for remote booting over a network, comprising:
a computer readable medium comprising:
a language agent with a preboot execution language interpreter, the language agent from a second system; and
at least one specification for performing at least one task in a preboot execution environment for remotely booting a computer over a network, the at least one specification from the second system,
wherein the language agent is configured to interpret the at least one specification, and configured to perform the at least one task specified,
wherein the at least one specification is an encapsulation, encapsulating parameters to be resolved at the system at execution time by the preboot execution language interpreter from the second system,
wherein the language agent is configured to generate one or more encapsulations and to interpret one or more encapsulations,
wherein the language agent is based on an encapsulated object-oriented polyphase language, and
wherein while executing an encapsulation, the language agent is configured to generate another encapsulation.

19. The system of claim 18, wherein the preboot execution language interpreter is an object-oriented language interpreter.

20. The system of claim 18, wherein the encapsulated parameters are parametric behaviors as well as parametric data.

21. The system of claim 18, wherein an image set for remote booting itself is a self-describing encapsulation, containing the at least one specification as an encapsulation which encapsulates parameters resolved by the preboot execution language interpreter at execution time.

22. A method for executing computing tasks in a preboot execution environment, comprising:
- receiving by a first system from a second system a language agent with a preboot execution language interpreter;
- generating one or more encapsulations by the language agent;
- interpreting one or more encapsulations by the language agent;
- receiving by the first system from the second system at least one specification for performing at least one computing task in the preboot execution environment;
- interpreting by the language agent the at least one specification for performing at least one computing task in the preboot execution environment;
- performing the at least one computing task specified; and
- while executing an encapsulation, generating another encapsulation,
- wherein the at least one specification is an encapsulation, encapsulating parameters resolved at the first system at execution time by the preboot execution language interpreter from the second system, and
- wherein the language agent is based on an encapsulated object-oriented polyphase language.

23. The method of claim 22, wherein the preboot execution language interpreter is an object-oriented language interpreter.

24. The method of claim 22, wherein the encapsulated parameters are parametric behaviors as well as parametric data.

25. A method for image installation in a preboot execution environment, comprising:
- receiving by a first system from a second system a language agent with a preboot execution language interpreter;
- generating one or more encapsulations by the language agent;
- interpreting one or more encapsulations by the language agent;
- receiving by the first system from the second system at least one specification for performing at least one task for image installation in the preboot execution environment;
- interpreting by the language agent the at least one specification for performing at least one task for image installation in the preboot execution environment;
- performing the at least one task for image installation specified; and
- while executing an encapsulation, generating another encapsulation,
- wherein the at least one specification is an encapsulation, encapsulating parameters resolved at the first system at execution time by the preboot execution language interpreter from the second system, and
- wherein the language agent is based on an encapsulated object-oriented polyphase language.

26. The method of claim 25, wherein the preboot execution language interpreter is an object-oriented language interpreter.

27. The method of claim 25, wherein the encapsulated parameters are parametric behaviors as well as parametric data.

28. The method of claim 25, wherein an image set for image installation itself is a self-describing encapsulation, containing the at least one specification as an encapsulation which encapsulates parameters resolved by the preboot execution language interpreter at execution time.

29. A method for remote imaging in a preboot execution environment, comprising:
- receiving by a first system from a second system a language agent with a preboot execution language interpreter;
- generating one or more encapsulations by the language agent;
- interpreting one or more encapsulations by the language agent;
- receiving by the first system from the second system at least one specification for performing at least one task for remote imaging in the preboot execution environment;
- interpreting by the language agent the at least one specification for performing at least one task for remote imaging in the preboot execution environment;
- performing the at least one task for remote imaging specified; and
- while executing an encapsulation, generating another encapsulation,
- wherein the at least one specification is an encapsulation, which encapsulates parameters resolved at the first system at execution time by the preboot execution language interpreter from the second system, and
- wherein the language agent is based on an encapsulated object-oriented polyphase language.

30. The method of claim 29, wherein the preboot execution language interpreter is an object-oriented language interpreter.

31. The method of claim 29, wherein the encapsulated parameters are parametric behaviors as well as parametric data.

32. The method of claim 29, wherein an image set for remote imaging itself is a self-describing encapsulation, containing the at least one specification as an encapsulation which encapsulates parameters resolved by the preboot execution language interpreter at execution time.

33. A method for remote booting in a preboot execution environment, comprising:
- receiving by a first system from a second system a language agent with a preboot execution language interpreter;
- generating one or more encapsulations by the language agent;
- interpreting one or more encapsulations by the language agent;
- receiving by the first system from the second system at least one specification for performing at least one task for remote booting in the preboot execution environment;
- interpreting by the language agent the at least one specification for performing at least one task for remote booting in the preboot execution environment;
- performing the at least one task for remote booting specified; and
- while executing an encapsulation, generating another encapsulation,
- wherein the at least one specification is an encapsulation, which encapsulates parameters resolved at the first system at execution time by the preboot execution language interpreter from the second system, and
- wherein the language agent is based on an encapsulated object-oriented polyphase language.

34. The method of claim 33, wherein the preboot execution language interpreter is an object-oriented language interpreter.

35. The method of claim 33, wherein the encapsulated parameters are parametric behaviors as well as parametric data.

36. The method of claim 33, wherein an image set for remote booting itself is a self-describing encapsulation, containing the at least one specification as an encapsulation which encapsulates parameters resolved by the preboot execution language interpreter at execution time.

37. A system for specifying computing tasks in a preboot execution environment, comprising:
a computer readable medium comprising:
a language agent with a preboot execution specification generator; and
a definition for at least one specification for performing at least one computing task in a preboot execution environment,
wherein the at least one specification is an encapsulation, encapsulating parameters to be resolved at a second system at execution time by a preboot execution language interpreter located at the second system,
wherein the language agent is configured to generate one or more encapsulations and to interpret one or more encapsulations,
wherein the language agent is based on an encapsulated object-oriented polyphase language, and
wherein while executing an encapsulation, the language agent is configured to generate another encapsulation.

38. The system of claim 37, wherein the at least one specification is generated from the definition by the language agent with a preboot execution specification generator.

39. The system of claim 37, wherein the preboot execution specification generator is an object-oriented language code generator.

40. The system of claim 37, wherein the encapsulated parameters are parametric behaviors as well as parametric data.

41. A system for specifying tasks for image installation in a preboot execution environment, comprising:
a computer readable medium comprising:
a language agent with a preboot execution specification generator; and
a definition for at least one specification for performing at least one task for image installation in a preboot execution environment,
wherein the at least one specification is an encapsulation, encapsulating parameters to be resolved at a second system at execution time by a preboot execution language interpreter located at the second system,
wherein the language agent is configured to generate one or more encapsulations and to interpret one or more encapsulations,
wherein the language agent is based on an encapsulated object-oriented polyphase language, and
wherein while executing an encapsulation, the language agent is configured to generate another encapsulation.

42. The system of claim 41, wherein the at least one specification is generated from the definition by the language agent with a preboot execution specification generator.

43. The system of claim 41, wherein the preboot execution specification generator is an object-oriented language code generator.

44. The system of claim 41, wherein the encapsulated parameters are parametric behaviors as well as parametric data.

45. The system of claim 41, wherein the at least one specification which is an encapsulation is a part of an image set for image installation, which henceforth renders the image set itself to be a self-describing encapsulation, encapsulating parameters resolved at execution time.

46. A system for specifying remote imaging tasks in a preboot execution environment, comprising:
a computer readable medium comprising:
a language agent with a preboot execution specification generator; and
a definition for at least one specification for performing at least one task for remote imaging in a preboot execution environment,
wherein the at least one specification is an encapsulation, encapsulating parameters to be resolved at a second system at execution time by a preboot execution language interpreter located at the second system,
wherein the language agent is configured to generate one or more encapsulations and to interpret one or more encapsulations,
wherein the language agent is based on an encapsulated object-oriented polyphase language, and
wherein while executing an encapsulation, the language agent is configured to generate another encapsulation.

47. The system of claim 46, wherein the at least one specification is generated from the definition by the language agent with a preboot execution specification generator.

48. The system of claim 46, wherein the preboot execution specification generator is an object-oriented language code generator.

49. The system of claim 46, wherein the encapsulated parameters are parametric behaviors as well as parametric data.

50. The system of claim 46, wherein the at least one specification which is an encapsulation is a part of an image set for remote imaging, which henceforth renders the image set itself to be a self-describing encapsulation, encapsulating parameters resolved at execution time.

51. A system for specifying remote booting tasks in a preboot execution environment, comprising:
a computer readable medium comprising:
a language agent with a preboot execution specification generator; and
a definition for at least one specification for performing at least one task for remote booting in a preboot execution environment,
wherein the at least one specification is an encapsulation, encapsulating parameters to be resolved at a second system at execution time by a preboot execution language interpreter located at the second system,
wherein the language agent is configured to generate one or more encapsulations and to interpret one or more encapsulations,
wherein the language agent is based on an encapsulated object-oriented polyphase language, and
wherein while executing an encapsulation, the language agent is configured to generate another encapsulation.

52. The system of claim 51, wherein the at least one specification is generated from the definition by the language agent with a preboot execution specification generator.

53. The system of claim 51, wherein the preboot execution specification generator is an object-oriented language code generator.

54. The system of claim 51, wherein the encapsulated parameters are parametric behaviors as well as parametric data.

55. The system of claim 51, wherein the at least one specification which is an encapsulation is a part of an image set for remote booting, which henceforth renders the image set itself to be a self-describing encapsulation, encapsulating parameters resolved at execution time.

56. A method for specifying computing tasks in a preboot execution environment, comprising:
providing at a first system a language agent with a preboot execution specification generator;
providing at the first system at least one definition for at least one computing task in a preboot execution environment;
generating at the first system a preboot execution specification from the at least one definition utilizing the language agent with a preboot execution specification generator;
generating one or more encapsulations by the language agent;
interpreting one or more encapsulations by the language agent; and
while executing an encapsulation, generating another encapsulation,
wherein the preboot execution specification is an encapsulation, encapsulating parameters to be resolved at a second system at execution time by a preboot execution language interpreter located at the second system, and
wherein the language agent is based on an encapsulated object-oriented polyphase language.

57. The method of claim 56, wherein the preboot execution specification generator is an object-oriented language code generator.

58. The method of claim 56, further comprising:
generating at the first system a preboot execution specification from the at least one definition utilizing the language agent,
wherein the preboot execution specification is an encapsulation, encapsulating parameters to be resolved at a second system at execution time by a preboot execution language interpreter located at the second system.

59. The method of claim 58, wherein the encapsulated parameters are parametric behaviors as well as parametric data.

60. A method for specifying computing tasks for image installation in a preboot execution environment, comprising:
providing at a first system a language agent with a preboot execution specification generator;
providing at the first system at least one definition for at least one computing task for image installation in a preboot execution environment;
generating at the first system a preboot execution specification from the at least one definition utilizing the language agent with a preboot execution specification generator;
generating one or more encapsulations by the language agent;
interpreting one or more encapsulations by the language agent; and
while executing an encapsulation, generating another encapsulation,
wherein the preboot execution specification is an encapsulation, encapsulating parameters to be resolved at a second system at execution time by a preboot execution language interpreter located at the second system, and
wherein the language agent is based on an encapsulated object-oriented polyphase language.

61. The method of claim 60, wherein the preboot execution specification generator is an object-oriented language code generator.

62. The method of claim 60, further comprising:
generating at the first system a preboot execution specification from the at least one definition utilizing the language agent,
wherein the preboot execution specification is an encapsulation, encapsulating parameters to be resolved at a second system at execution time by a preboot execution language interpreter located at the second system.

63. The method of claim 62, wherein the encapsulated parameters are parametric behaviors as well as parametric data.

64. The method of claim 62, wherein the preboot execution specification, which is an encapsulation, is a part of an image set for image installation, which henceforth renders the image set itself to be a self-describing encapsulation, encapsulating parameters resolved at execution time.

65. A method for specifying remote imaging in a preboot execution environment, comprising:
providing at a first system a language agent with a preboot execution specification generator;
providing at the first system at least one definition for at least one computing task for remote imaging in a preboot execution environment;
generating at the first system a preboot execution specification from the at least one definition utilizing the language agent with a preboot execution specification generator;
generating one or more encapsulations by the language agent;
interpreting one or more encapsulations by the language agent; and
while executing an encapsulation, generating another encapsulation,
wherein the preboot execution specification is an encapsulation, encapsulating parameters to be resolved at a second system at execution time by a preboot execution language interpreter located at the second system, and
wherein the language agent is based on an encapsulated object-oriented polyphase language.

66. The method of claim 65, wherein the preboot execution specification generator is an object-oriented language code generator.

67. The method of claim 65, wherein the encapsulated parameters are parametric behaviors as well as parametric data.

68. The method of claim 65, wherein the preboot execution specification, which is an encapsulation, is itself a part of an image set for remote imaging, which henceforth renders the image set itself to be a self-describing encapsulation.

69. The method of claim 65, further comprising:
generating at the first system a preboot execution specification from the at least one definition utilizing the language agent,
wherein the preboot execution specification is an encapsulation, encapsulating parameters to be resolved at a second system at execution time by a preboot execution language interpreter located at the second system.

70. A method for specifying remote booting operations in a preboot execution environment, comprising:
providing at a first system a language agent with a preboot execution specification generator;
providing at the first system at least one definition for at least one computing task for remote booting in a preboot execution environment;

generating at the first system a preboot execution specification from the at least one definition utilizing the language agent with a preboot execution specification generator;
generating one or more encapsulations by the language agent;
interpreting one or more encapsulations by the language agent; and
while executing an encapsulation, generating another encapsulation,
wherein the preboot execution specification is an encapsulation, encapsulating parameters to be resolved at a second system at execution time by a preboot execution language interpreter located at the second system, and
wherein the language agent is based on an encapsulated object-oriented polyphase language.

71. The method of claim 70, wherein the preboot execution specification generator is an object-oriented language code generator.

72. The method of claim 70, further comprising:
generating at the first system a preboot execution specification from the at least one definition utilizing the language agent,
wherein the preboot execution specification is an encapsulation, encapsulating parameters to be resolved at a second system at execution time by a preboot execution language interpreter located at the second system.

73. The method of claim 72, wherein the encapsulated parameters are parametric behaviors as well as parametric data.

74. The method of claim 72, wherein the preboot execution specification, which is an encapsulation, is itself a part of an image set for remote booting, which henceforth renders the image set itself to be a self-describing encapsulation.

75. A system for encapsulated platform imaging, comprising:
a computer readable medium comprising:
a language agent with an encapsulated language interpreter for executing an encapsulation, the language agent from a second system, the encapsulation from the second system,
wherein the encapsulation contains all instructions and data necessary to install an operating system onto a computing device,
wherein the encapsulation encapsulates parameters to be resolved at the system at execution time by the encapsulated language interpreter from the second system,
wherein the language agent is configured to generate one or more encapsulations and to interpret one or more encapsulations,
wherein the language agent is based on an encapsulated object-oriented polyphase language, and
wherein while executing an encapsulation, the language agent is configured to generate another encapsulation.

76. The system of claim 75, further comprising:
a logical connection, wherein the language agent with an encapsulated language interpreter and the encapsulation is provided over the logical connection.

77. The system of claim 76, wherein the logical connection is a computer readable medium.

78. The system of claim 77, further comprising:
a bootable interface on the computer readable medium.

79. The system of claim 76, wherein the logical connection is a network connection.

80. The system of claim 79, further comprising:
a bootable interface on the network connection.

81. The system of claim 80, wherein the bootable interface on the network connection is a Preboot Execution Environment (PXE) implementation.

82. A method for encapsulated platform imaging, comprising:
receiving by a computing device from another system an encapsulation which contains all instructions and data necessary to install an operating system onto the computing device;
receiving by the computing device from the another system a language agent with an encapsulated language interpreter for executing the encapsulation;
executing by the language agent at the computing device the encapsulation to install the operating system onto the computing device;
generating one or more encapsulations by the language agent;
interpreting one or more encapsulations by the language agent; and
while executing an encapsulation, generating another encapsulation,
wherein the encapsulation encapsulates parameters resolved by the language agent at the computing device at execution time, the language agent located at the computing device, and
wherein the language agent is based on an encapsulated object-oriented polyphase language.

83. The method of claim 82, wherein the encapsulation and the language interpreter are provided over a logical connection.

84. The method of claim 83, wherein the logical connection is a computer readable medium.

85. The method of claim 84, further comprising:
providing a bootable interface on the computer readable medium.

86. The method of claim 85, further comprising:
booting from the computer readable medium;
loading the language agent with an encapsulated language interpreter for executing the encapsulation from the computer readable medium; and
loading the encapsulation from the computer readable medium before executing the encapsulation.

87. The method of claim 83, wherein the logical connection is a network connection.

88. The method of claim 87, further comprising:
providing a bootable interface on the network connection.

89. The method of claim 88, further comprising:
booting over the network connection;
loading the language agent with an encapsulated language interpreter for executing the encapsulation over the network connection; and
loading the encapsulation over the network connection before executing the encapsulation.

90. The method of claim 88, wherein the bootable interface on the network connection is a Preboot Execution Environment (PXE) implementation.

91. A system for encapsulated platform imaging, comprising:
a computer readable medium comprising:
a language agent with an encapsulation generator for defining and creating an encapsulation,
wherein the encapsulation contains all instructions and data necessary to install an operating system onto a computing device,
wherein the encapsulation encapsulates parameters to be resolved at a second system at execution time by a language interpreter located at the second system, wherein the language agent is configured to generate one or more encapsulations and to interpret one or more encapsulations, wherein the language agent is based on an encapsulated object-oriented polyphase language, and wherein while executing an encapsulation, the language agent is configured to generate another encapsulation.

92. The system of claim 91, wherein no programs or codes are preserved separate from the encapsulation.

93. A method for encapsulated platform imaging, comprising:

providing at a first system a language agent with an encapsulation generator;

providing at the first system a definition for an encapsulation;

generating at the first system from the definition an encapsulation containing all instructions and data necessary to install an operating system onto a computing device by utilizing the language agent with an encapsulation generator;

generating one or more encapsulations by the language agent;

interpreting one or more encapsulations by the language agent; and while executing an encapsulation, generating another encapsulation, wherein the encapsulation encapsulates parameters to be resolved at a second system at execution time by a language interpreter located at the second system, wherein the language agent is based on an encapsulated object-oriented polyphase language.

94. A system for executing computing tasks in a preboot execution environment, comprising:

means for receiving by the system a language agent with a preboot execution language interpreter, the language agent originated from a second system;

means for receiving by the system at least one specification for performing at least one computing task in the preboot execution environment, the at least one specification originated from the second system;

means for performing the at least one computing task specified;

means for generating one or more encapsulations;

means for interpreting one or more encapsulations; and means for, while executing an encapsulation, generating another encapsulation, wherein the at least one specification is an encapsulation, encapsulating parameters resolved at the system at execution time by the preboot execution language interpreter from the second system, wherein the language agent is configured to interpret the at least one specification for performing at least one computing task in the preboot execution environment, wherein the language agent is based on an encapsulated object-oriented polyphase language.

95. A system for specifying computing tasks in a preboot execution environment, comprising:

means for providing at the system a language agent with a preboot execution specification generator;

means for providing at the system at least one definition for at least one computing task in a preboot execution environment;

means for generating at the system a preboot execution specification from the at least one definition utilizing the language agent with a preboot execution specification generator;

means for generating one or more encapsulations;

means for interpreting one or more encapsulations; and means for, while executing an encapsulation, generating another encapsulation, wherein the preboot execution specification is an encapsulation, encapsulating parameters to be resolved at a second system at execution time by a preboot execution language interpreter located at the second system, and wherein the language agent is based on an encapsulated object-oriented polyphase language.

96. The system of claim 95, further comprising:

means for generating at the system a preboot execution specification from the at least one definition utilizing the language agent, wherein the preboot execution specification is an encapsulation, encapsulating parameters to be resolved at a second system at execution time by a preboot execution language interpreter located at the second system.

* * * * *